Sept. 6, 1938.   N. W. DORMAN   2,129,084
PNEUMATIC CONTROL VALVE
Filed Feb. 12, 1937   2 Sheets-Sheet 1

Inventor
Neal W. Dorman
By Owen & Owen
Attorneys

Sept. 6, 1938.  N. W. DORMAN  2,129,084
PNEUMATIC CONTROL VALVE
Filed Feb. 12, 1937  2 Sheets-Sheet 2
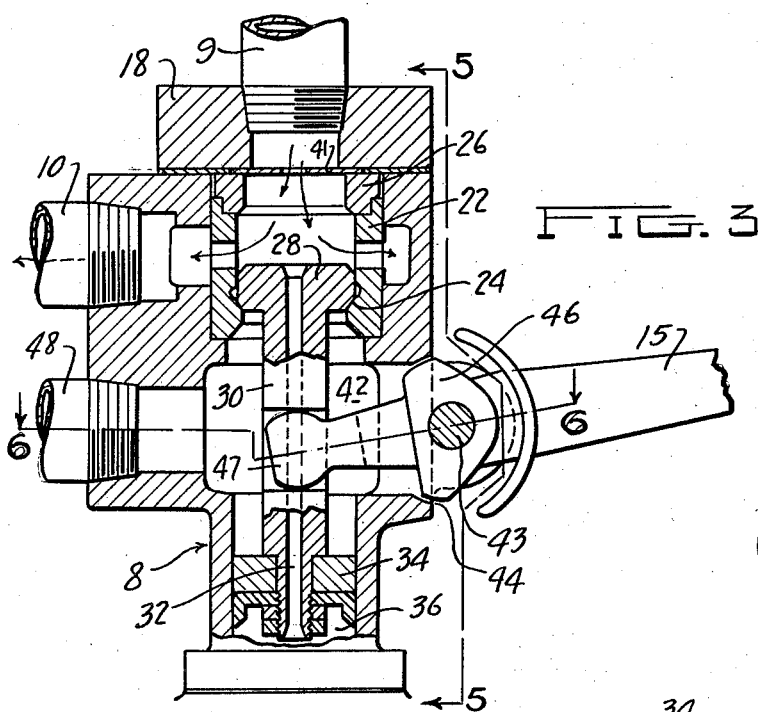
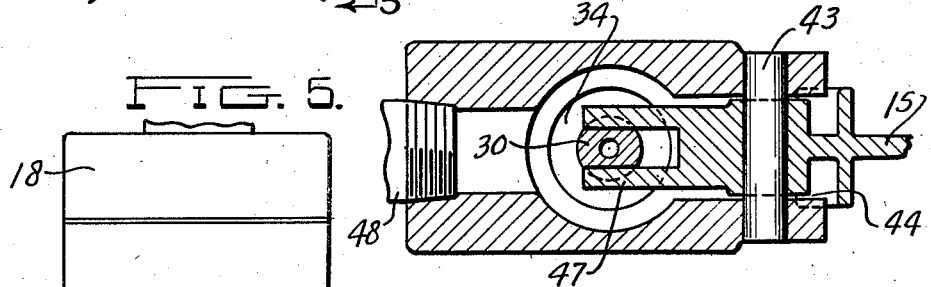
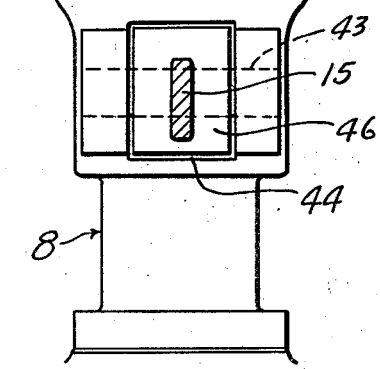
Inventor
Neal W. Dorman
Owen & Owen
By
Attorneys Patented Sept. 6, 1938

2,129,084

UNITED STATES PATENT OFFICE 2,129,084

PNEUMATIC CONTROL VALVE

Neal W. Dorman, Toledo, Ohio, assignor to The Toledo Machine & Tool Company, Toledo, Ohio, a corporation of Ohio Application February 12, 1937, Serial No. 125,403

2 Claims. (Cl. 277—2)

This invention relates to pneumatic control valves and is particularly directed to a valve in which the controlled fluid is used to aid in moving the valve.

The primary object of the invention is the provision of a valve which may be readily moved to either of two seating positions and which combines the features of piston and poppet types of valves.

Another object of the invention is the provision of pneumatically operated means connected to the valve head to urge the same to a predetermined position.

Still another object of the invention is the provision of simple and effective means to control the rate of discharge of fluid through the valve.

Other objects and advantages of the invention will become apparent as the description proceeds, reference being made to the accompanying drawings, in which—

Figure 1:
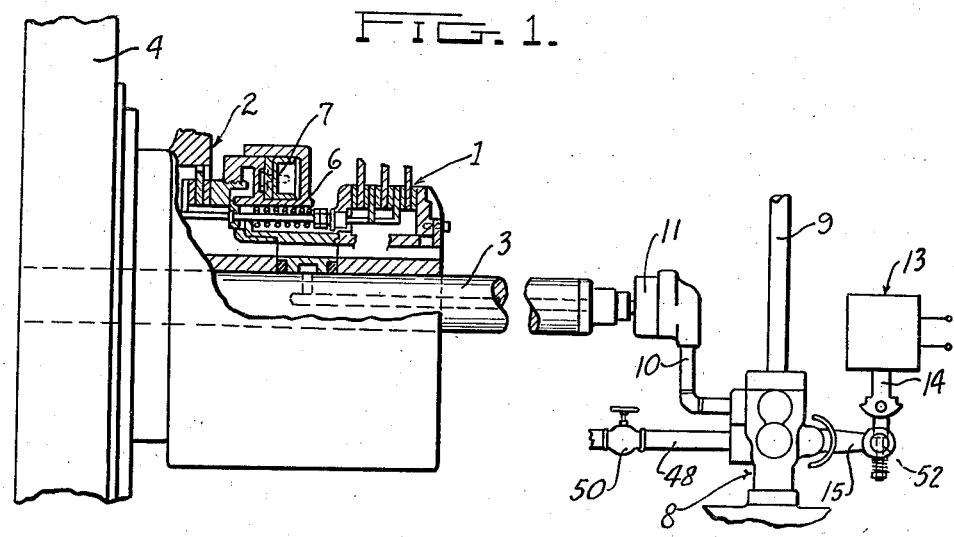
Figure 2:
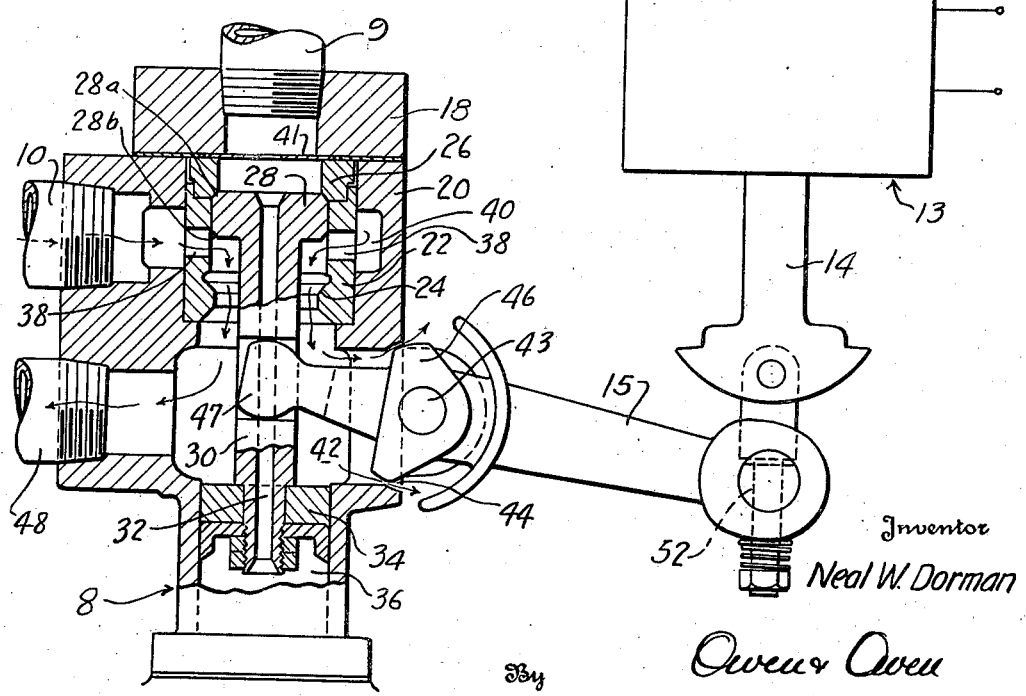

Figure 1 is a somewhat diagrammatic, fragmentary view, with parts broken away, showing an installation of a valve constructed in accordance with the present invention in connection with a clutch and brake control for the shaft of a machine; Fig. 2 is a central vertical sectional view, with parts in full, of a valve and its immediate operating mechanism, with the parts standing in one position; Fig. 3 is a central vertical sectional view, with parts in full, of a valve, with the parts standing in another position; Fig. 4 is a detail view of a metering gasket; Fig. 5 is a section on line 5—5 of Fig. 3, and Fig. 6 is a section on line 6—6 of Fig. 5.

Referring to the drawings, Fig. 1 shows an installation in which a valve constructed in accordance with the present invention may be used to control a brake 1 and clutch 2 disposed on a shaft 3 of a power press or similar machine having a flywheel 4. In the operation of machinery of this character, it is desirable to periodically interrupt the driving connection between the flywheel and shaft of the machine so that the press may be made to complete one stroke and stop. It is also desirable that the machine may be "inched" down in its stroke for the purpose of setting dies or making adjustments in the machine. During this operation, power is repeatedly applied for very short intervals to drive the parts to a desired position. The clutch and brake assembly shown in Fig. 1 is constructed so that springs 6 normally urge the friction plates of the brake in engagement and disengage the plates of the clutch. Air piston and cylinder assemblies 7 are provided to overcome the force of the springs 6 and to release the brake and engage the clutch plates so that the shaft of the machine may be driven from the flywheel. The present invention is directed to a valve which may be used to control the admission of air to the piston and cylinder assemblies 7.

The valve is designated generally at 8 in Fig. 1 and is connected to a fluid pressure supply pipe 9 and outlet pipe 10 which is connected by any suitable means such as a swivel joint 11 to the center of the shaft 3 which is drilled to form an air passage. The operating fluid, hereinafter referred to as air, passes through the center of the shaft 3 and is led by any suitable conduits to the assemblies 7 which operate the clutch and brake mechanisms over the tension of the springs 6. The movement of the valve to its various positions is accomplished, in the present instance, by an electrical device which includes a solenoid 13 having a plunger 14 operating therein and connected to a valve operating arm 15 in a manner hereinafter described.

As shown in Fig. 2, the air supply pipe 9 is connected to a terminal block 18 which is seated on a valve body 20 so that the pipe 9 is in communication with the several central passages of the valve body. A machined working cylinder 22, having at its lower end portion an internal shoulder forming a lower tapered annular valve seat 24, is inserted in the valve body 20. An upper ring valve seat 26 is inserted above the working cylinder 22 and is tapered at its lower inner edge.

A reciprocating valve 28 having a cylindrical center portion and upper and lower tapered seats 28ª and 28ᵇ, respectively, is disposed in the working cylinder 22 and has a close fit therewith so that the cylindrical portion of the valve acts as a close fitting piston to prevent leakage of air past its surface. The tapered seats on the valve correspond in slope to the seats 24 and 26 at the ends of the cylinder.

The valve 28 is carried on the end of a stem 30 which is preferably drilled throughout its length to form a passage 32 through the stem and valve, which passage is constantly open to the air supply pipe 9. A piston 34 is fixed to the opposite end of the stem 30 and is disposed within a closed pressure cylinder 36 in the lower end of the valve body 20. The piston 34 is suitably packed to prevent leakage of air from the pressure cylinder 36. It will be seen that the cylinder 36 is constantly in communication with the source of air pressure through the passage 32 in the stem 30. Any suitable conduit, however, may be used to supply air under pressure to this cylinder. The piston 34 and its associated cylinder are made larger in area than the head of the valve 28 so that when the air pressure in the cylinder 36 is equalized with the air in supply pipe 9 it exerts an unequal force on the two ends, in favor of the piston, and urges the valve to its upper seating position against the seat 26.

The working cylinder 22 is provided with a series of spaced radial ports 38 which open into an annular passage 40 in the valve body 20 and communicate through it with the outlet pipe 10. The ports 38 are spaced from the upper seat 26 so that the valve 28 must move a considerable distance before it will uncover the outlet ports. A discharge or exhaust chamber 42 is also provided in the valve body 20 and is placed in controlled communication with the cylinder 22 through the lower end thereof. It will be seen that when the valve is in its upper seating position, as shown in Fig. 2, the outlet pipe 10 and exhaust chamber 42 are in open communication. When the valve 28 is in its lower seating position, as shown in Fig. 3, so that the lower tapered seat of the valve is against valve seat 24 of the cylinder, the outlet pipe 10 is in communication with the supply pipe 9.

A metering gasket 41 having a central orifice formed therein of a predetermined size is inserted between the terminal block 18 and the valve body 20 to control the maximum rate of flow from the supply pipe 9.

The operating arm 15 which moves the valve to its lower seating position is pivoted to the valve body 20 at 43 and enters the exhaust chamber 42 through an opening 44 in one side of the valve body 20, and has an enlarged shoulder 46 which conforms closely to the size and shape of the opening 44. The inner end of the arm 15 is split to form a bifurcated yoke 47 which engages in suitable recesses in the periphery of the stem 30. Obviously, any suitable connection may be used between the operating lever and the reciprocating valve. An exhaust conduit 48 enters the valve body to communicate with the exhaust chamber 42 and is preferably provided with a control valve 50 so as to control the rate at which air may exhaust from the chamber 42. It will be seen that it is impossible for the operator to prevent exhaust of the air entirely, since a predetermined quantity will leak past the surfaces of the boss 46 through the opening 44 in the valve body. Thus, even though the valve 28 may move rapidly to its upper seating position so as to open the outlet pipe 10 to the exhaust chamber, the actual flow of exhausting air will be retarded by reason of the fact that the operator may set the valve 50 to give any desired rate of exhaust. When used with the clutch and brake mechanism shown in Fig. 1 on the shaft of a press or similar machine, this will prevent too rapid engagement of the brake and any consequent damage which may be caused by shock to the parts of the machine.

Any suitable lost motion connection illustrated at 52 may be provided for the plunger of the solenoid at its connection with the operating arm 15 so that the plunger will seat properly in the solenoid regardless of the adjustment of the valve.

It will be seen that the present invention provides a valve which, even though one of the tapered seats may become fouled from dirt in the air line, will be effective in controlling the flow of air to and from the outlet pipe 10 by reason of the fact that it is, to a certain extent, independent of the poppet type seats 24 and 26 at the top and bottom of the machined cylinder in which the valve operates. Thus, if a chip should lodge between the upper seat 26 and the head of the valve so as to prevent seating engagement of the latter, no air will leak from the pipe 9 past the cylindrical piston-like surface of the valve. Similarly, the cylindrical surface will prevent reduction of air pressure by leakage if the valve should fail to seat closely on the lower seat 24. These are important features in practice.

While the invention has been disclosed in connection with a particular arrangement and disposition of the parts, it should be expressly understood that various changes may be made in the form and relative disposition of the parts without departing from the invention, as defined in the appended claims.

Having thus described my invention, what I claim as new, and desire to secure by United States Letters Patent, is:

1. A fluid control valve comprising a valve body having endwise spaced working and pressure cylinders and having inlet and exhaust ports at opposite ends of said working cylinder and an intermediate outlet port all in communication with the working cylinder, said working cylinder having at opposite sides of said outlet port annular internal shoulders forming valve seats, a reciprocatory valve having a fluid tight sliding fit in said working cylinder and seating against one or the other of said shoulders at opposite ends of its movement and having a predetermined movement in one direction from seating position before the outlet opening is uncovered to have communication with the inlet opening, a piston in said pressure cylinder, connection between said valve and piston to cause one to move with the other, said pressure cylinder and the pressure supply to said inlet opening being in communication through said connection, piston and valve, and the area of said valve exposed to said inlet port being less than the area exposed to said pressure cylinder, whereby the piston and valve are normally urged by fluid pressure to stand in position to close communication between said inlet and outlet openings and open communication between said outlet and exhaust ports through the working cylinder, and means operable to move the valve and piston to the opposite ends of their strokes against said fluid pressure action.

2. A fluid control valve comprising a valve body having endwise spaced working and pressure cylinders and also having inlet and exhaust ports at opposite ends of said working cylinder and an intermediate outlet port all in communication with the working cylinder, said working cylinder having at opposite sides of said outlet port annular internal shoulders forming angular valve seats, a reciprocatory valve having a close sliding fit in said working cylinder and seating against one or the other of said shoulders at opposite ends of its movement, a piston in said pressure cylinder, a connection between said valve and piston to cause one to move with the other, said pressure cylinder and the pressure supply to said inlet port being in communication, and the area of said valve exposed to said inlet port being less than the area of said piston exposed to said pressure cylinder, whereby the piston and valve are normally urged by fluid pressure to stand in position to close communication between said inlet and outlet ports and open communication between said outlet and exhaust ports through the working cylinder, and means operable to move the valve and piston to the opposite ends of their strokes against said fluid pressure action.

NEAL W. DORMAN.